(12) United States Patent
Takaoka et al.

(10) Patent No.: US 6,430,483 B2
(45) Date of Patent: Aug. 6, 2002

(54) CONTROL APPARATUS OF HYBRID VEHICLE AND CONTROL METHOD THEREOF

(75) Inventors: Toshifumi Takaoka; Katsuhiko Hirose, both of Susono; Naoto Suzuki, Fujinomiya, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/842,421

(22) Filed: Apr. 27, 2001

(30) Foreign Application Priority Data

May 11, 2000 (JP) ........................................ 2000-138586

(51) Int. Cl.[7] ............................ F02D 29/02; B60L 11/14
(52) U.S. Cl. .............................. 701/22; 701/64; 701/84; 180/65.1; 180/65.3
(58) Field of Search .............................. 701/22, 54, 55, 701/64, 67, 84, 90; 477/39, 87, 86; 180/65.1, 65.2, 65.3

(56) References Cited

U.S. PATENT DOCUMENTS 5,841,201 A * 11/1998 Tabata et al. .............. 180/65.4

FOREIGN PATENT DOCUMENTS

JP 11-69509 A 3/1999

* cited by examiner

*Primary Examiner*—Tan Nguyen
(74) *Attorney, Agent, or Firm*—Oliff & Berridge PLC (57) ABSTRACT

A control apparatus is used to control a hybrid vehicle having an internal combustion engine, a stepwise variable transmission capable of automatic speed shifting, a clutch disposed between the internal combustion engine and the stepwise variable transmission for discontinuing and establishing power transfer to and from the stepwise variable transmission, an electric motor, etc. The control apparatus calculates a timing of the stepwise variable transmission starting an automatic shifting operation, and gradually decreases the torque assist based on the motor torque Tm of the electric motor prior to the start of the shifting operation, so as to reduce the stepped change in the drive torque that occurs when the engine torque Te is eliminated upon disengagement of the clutch during the shifting operation. This operation of the control apparatus also gentles or reduces the gradient of torque change. The shock at the time of shifting is thus reduced.

29 Claims, 7 Drawing Sheets

CONTROL APPARATUS OF HYBRID VEHICLE AND CONTROL METHOD THEREOF

INCORPORATION BY REFERENCE

The disclosure of Japanese Patent Application No. 12-138586 filed on May 11, 2000 including the specification, drawings and abstract is incorporated herein by reference in its entirety.

BACKGROUND OF THE INVENTION

1. Field of Invention

The present invention relates to a control apparatus of a hybrid vehicle and, more particularly, to an improvement in a hybrid vehicle control apparatus that is capable of reducing the shock caused by torque fluctuations during speed shifts in a hybrid vehicle that has a stepwise variable transmission capable of automatically performing speed shifts without employing a torque converter.

2. Description of Related Art

Recently, hybrid vehicles (hereinafter, referred to as "HVs") equipped with a hybrid system having great advantages in environmental protection and fuel economy improvement are being researched, developed and commercialized. An HV system is a power train that incorporates a combination of two kinds of drive power sources, such as an internal combustion engine (hereinafter, simply referred to as "engine") and an electric motor (normally, a motor-generator (referred to as "MG")) performing both the function of an electric motor and the function of a generator-motor (electric power generator). By selectively using the engine and the electric motor in accordance with the driving condition, the hybrid system can compensate for disadvantageous aspects of the two drive power sources while fully exploiting the advantages of the two drive power sources, so that smooth and highly responsive power performance can be achieved. This type of HV is equipped with a battery for driving the MG as an electric motor. The battery is charged by performing regenerative power generation through the use of the MG as a generator during deceleration of the vehicle.

Transmissions that can be employed in the aforementioned HVs include a continuously variable transmission capable of continuously changing the speed ratio while receiving torque from the engine and a stepwise variable transmission capable of discretely changing the speed ratio simultaneously with temporary discontinuation of torque from the engine. Some stepwise variable transmissions employed in HVs perform torque transfer using a torque converter, and some other stepwise variable transmissions torque transfer using a friction clutch. Among these transmissions, a stepwise variable transmission employing a friction clutch (hereinafter, referred to as "clutch-equipped stepwise variable automatic transmission") is being considered in various ways for commercialization as a transmission that is simple in construction and control and is suitable to HVs.

The aforementioned clutch-equipped stepwise variable automatic transmission automatically engages and disengages the clutch and performs speed-shifting based on the vehicle speed or the amount of depression of an accelerator pedal caused by a driving person (accelerator operation amount). Thus, the clutch-equipped stepwise variable automatic transmission realizes easy shifting that does not require a driving person to operate a clutch pedal or the like, at a relatively low cost.

In some cases, however, while the HV is running at a constant acceleration (i.e., the HV is gradually accelerating with a constant amount of accelerator operation), the clutch-equipped stepwise variable automatic transmission performs a shift from a low speed side to a high speed side based on, for example, the vehicle speed and the amount of accelerator operation. In such a case, the clutch is automatically disengaged to start a shifting operation although a driving person does not intend the operation (although a driving person does not change the amount of accelerator operation or the like). In this case, the disengagement of the clutch temporarily discontinues drive torque, and therefore the HV decelerates.

As a result, a deceleration shock is caused by torque fluctuation, thus discomforting the driving person.

An HV speed shift control apparatus for reducing the deceleration feel (deceleration shock) through torque assist achieved by increasing the drive torque of the electric motor (MG) simultaneously with disengagement of the clutch is disclosed in, for example, Japanese Patent Application Laid-Open No. 11-69509.

If the running of the HV is controlled through coordination between the drive torque of the engine and the drive torque of the electric motor (MG), the control described in Japanese Patent Application Laid-Open No. 11-69509 is able to avoid complete depletion of drive torque from the entire HV since a drive torque of the HV can be secured by the torque assist from the electric motor, despite elimination of engine torque. However, at the time of disengagement of the clutch, a sharp torque assist provided by the electric motor causes another torque shock, resulting in insufficient eradication of the discomfort to a driver.

SUMMARY OF THE INVENTION

The invention has been accomplished in view of the aforementioned problems. It is an object of the invention to provide a control apparatus for a hybrid vehicle capable of reducing a deceleration shock caused by torque fluctuation during a speed shift and reducing the discomfort perceived by a driving person.

To achieve the aforementioned object, the invention provides a control apparatus for a hybrid vehicle having an internal combustion engine, a stepwise variable transmission capable of automatic shifting, a clutch that is disposed between the internal combustion engine and the stepwise variable transmission and that discontinues and establishes a power transfer between the internal combustion engine and the stepwise variable transmission, and an electric motor that is disposed between the stepwise variable transmission and a drive wheel and that drives the drive wheel and performs regenerative power generation using the drive wheel., The control apparatus comprises a shift control means for performing a control of performing a shifting operation of the stepwise variable transmission at a start of elimination of a drive torque of the internal combustion engine caused by disengaging the clutch, and of recovering the drive torque of the internal combustion engine by re-engaging the clutch, when the hybrid vehicle is running coordinately by the drive torque generated by the internal combustion engine and a drive torque generated by the electric motor; and a motor control means for performing a control of increasing and decreasing the drive torque of the electric motor based on a predicted automatic shifting operation.

Therefore, the control of increasing and decreasing the drive torque of the electric motor is performed in accordance with the timing of the automatic shifting operation of the stepwise variable transmission. Hence, fluctuation of the entire drive torque of the vehicle caused at the time of elimination of the drive torque of the internal combustion engine is controlled and thereby reduced, so that the deceleration shock can be reduced.

BRIEF DESCRIPTION OF THE DRAWINGS

The above and other objects, features, advantages, and technical and industrial significance of this invention will be better understood by reading the following detailed description of exemplary embodiments of the invention, when considered in connection with the accompanying drawings, in which like reference numerals designate like elements and wherein.

DETAILED DESCRIPTION OF PREFERRED EMBODIMENTS

In the following description and the accompanying drawings, the present invention will be described in more detail in terms of specific exemplary embodiments.

Exemplary embodiments of the invention will be described hereinafter with reference to the accompanying drawings.

Figure 1:
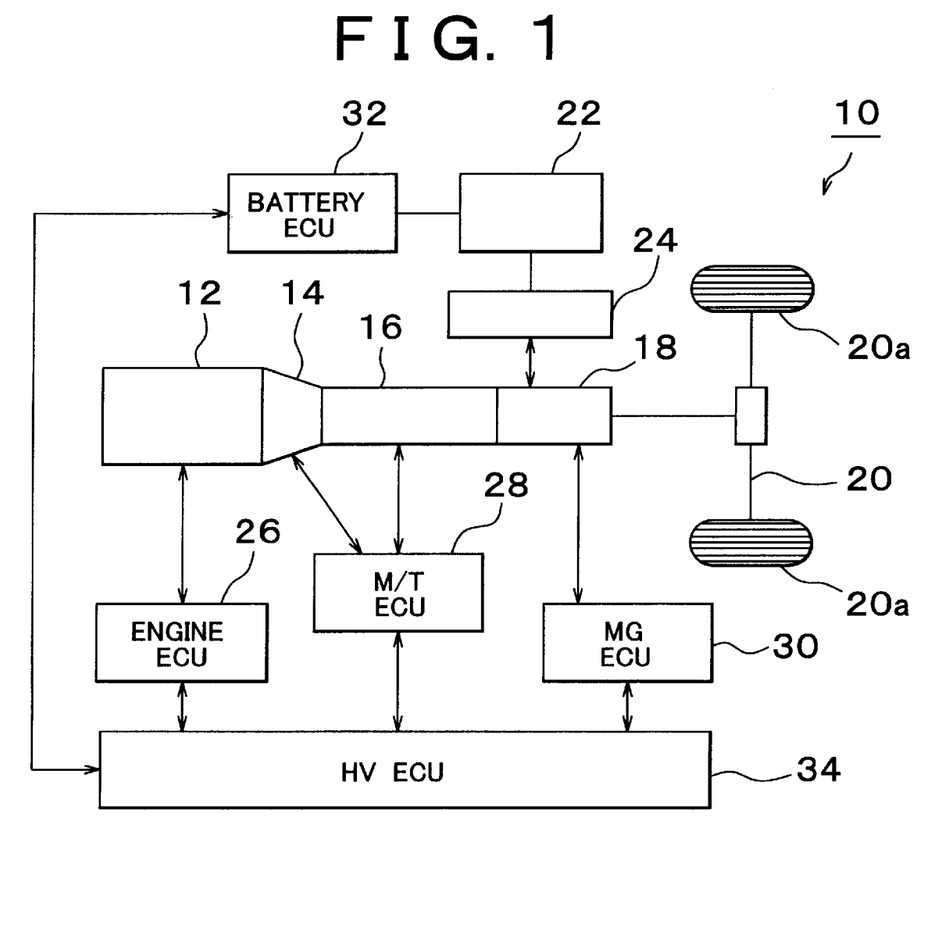
FIG. 1 is a block diagram of a construction of an HV equipped with a control apparatus in accordance with an exemplary embodiment of the invention.

FIG. 1 shows a conceptual diagram of a construction of a hybrid vehicle (HV) 10 in accordance with an exemplary embodiment of the invention. Installed as a drive power source in the RV 10 is an internal combustion engine (hereinafter, simply referred to as "engine") 12, for example, a gasoline engine, a diesel engine, etc. An output shaft of the engine 12 is connected to a stepwise variable transmission 16 via a friction clutch 14 that is automatically controllable. By disengaging the friction clutch 14, the supply of drive torque of the engine 12 to the stepwise variable transmission 16 is discontinued. During the discontinuation of the supply of torque, the transmission speed of the stepwise variable transmission 16 is changed. The stepwise variable transmission 16 is connected at its output side to a motor-generator (hereinafter, referred to as "MG") 18. The MG 18 is connected at its output side to axles 20 connected to drive wheels 20a. The MG 18, when used as an electric motor, performs torque assist for the axles 20. The MG 18 is connected to an HV battery 22 via an inverter 24. The HV battery 22 stores regenerative energy generated by the MG 18 when the MG 18 is used as a generator. The HV battery 22 supplies electric energy to the MG 18 when it is used as a motor. The inverter 24 controls current while performing conversion between the direct current of the HV battery 22 and the alternating current of the MG 18.

An engine control unit (hereinafter, referred to as "engine ECU") 26 for controlling the engine 12 is connected to the engine 12. A transmission ECU (hereinafter, referred to as "TM ECU") 28 is connected to the friction clutch 14 and the stepwise variable transmission 16. An MG ECU 30 and a battery ECU 32 are connected to the MG 18 and the HV battery 22, respectively. The ECUs are connected to and managed by an HV ECU 34 that performs overall control of the HV 10 and controls the HV 10 so that the HV 10 can run in an optimal state. The ECUs 26, 28, 30, 32 and 34 operate while exchanging information with one another. Information from various sensors (not shown) is supplied to the ECUs 26, 28, 30, 32 and 34, and is used for various controls. In other various exemplary embodiments, some or all of the ECUs 26, 28, 30, 32 and 34 are combined into a control unit.

In the HV 10 constructed as described above, a shifting operation is performed by the stepwise variable transmission as follows. Normally, if HV ECU 34 determines that a shift start timing is reached, based on information from a vehicle speed sensors, an accelerator operation amount sensor, etc., the TM ECU 28 automatically disengages the friction clutch 14 to discontinue the supply of drive torque from the engine 12 to the stepwise variable transmission 16. After that, the TM ECU 28 performs the shifting to a transmission speed in accordance with the vehicle speed and the accelerator operation amount, and then re-engages the friction clutch 14, thus completing the shifting operation. During this operation, when the supply of torque from the engine 12 to the stepwise variable transmission 16 is discontinued by disengaging the friction clutch 14, drive torque transmitted to the side of the axles 20 disappears, so that the HV 10 decelerates. Therefore, the MG 18 functions as a motor to perform drive torque assist.

A first embodiment will now be described. A feature of the first embodiment is that the deceleration feel (deceleration shock) that occurs at the time of a shifting operation of the HV 10 is reduced by controlling the timing and amount of torque assist performed by the MG 18.

Figure 2:
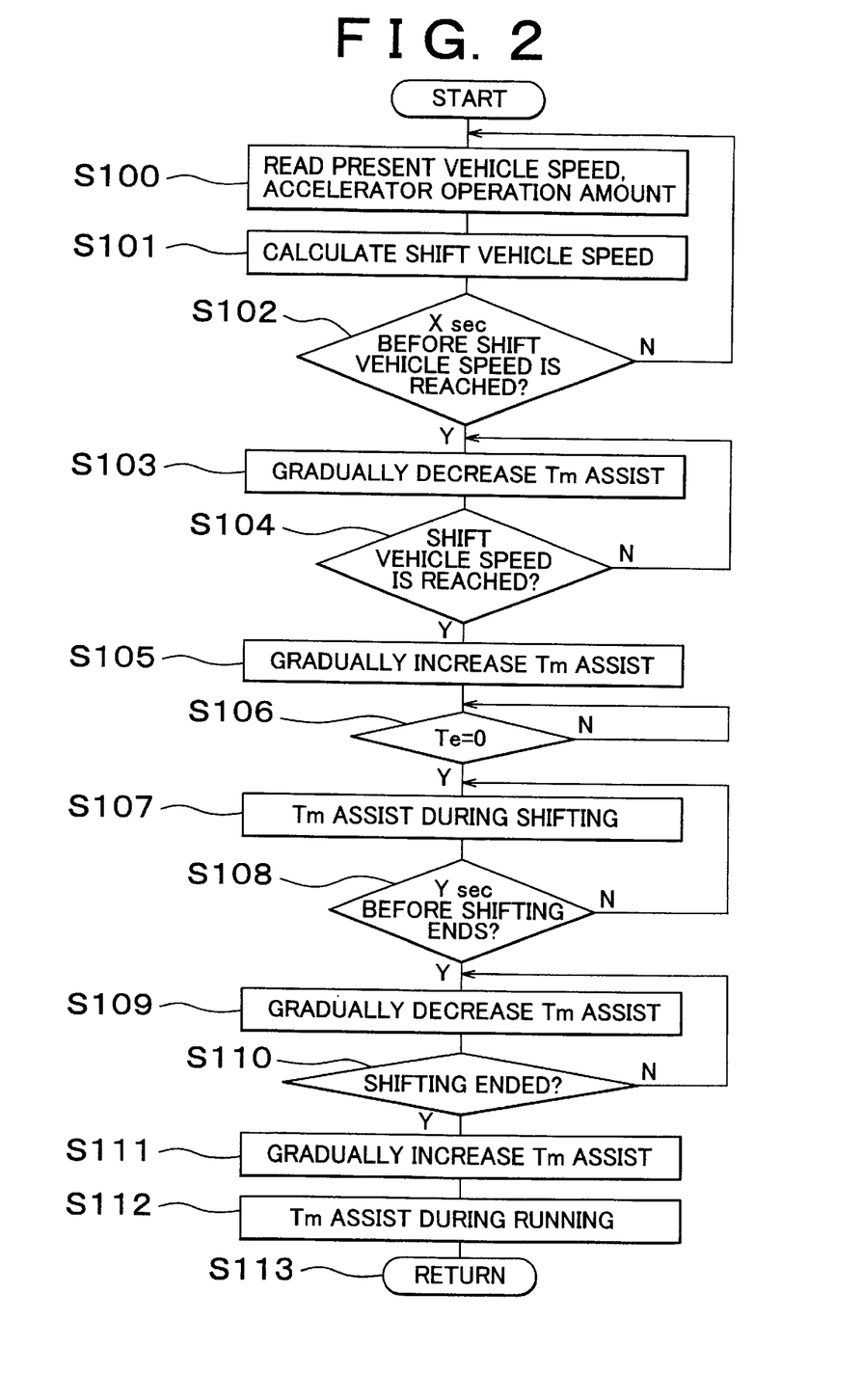
FIG. 2 is a flowchart illustrating a control procedure in accordance with a first exemplary embodiment of the invention.
Figure 3:
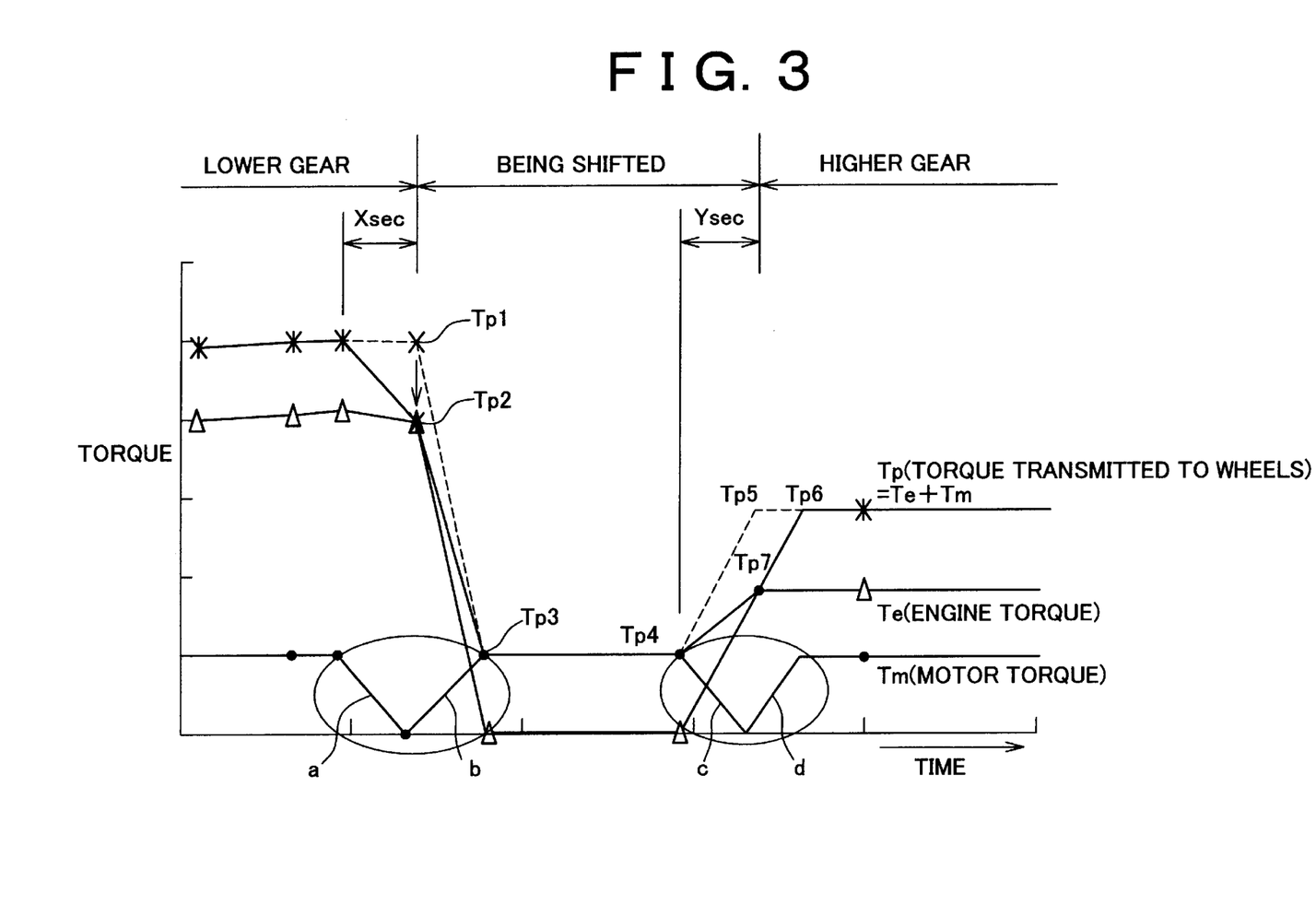
FIG. 3 is a diagram indicating changes in the engine torque Te, the motor torque Tm and the total torque Tp based on a control in accordance with the first exemplary embodiment of the invention.

FIG. 2 shows a flowchart illustrating a control procedure performed at the time of a speed shift of the HV 10. FIG. 3 indicates changes in the engine torque Te, the motor torque Tm, and the total Tp transmitted to the drive wheel side (i.t., Te+Tm) that occur at the time of a shift from a low gear side to a high gear side. In FIG. 3, it is assumed that the HV 10 is running based on coordination between the two kinds of torques generated by the engine 12 and the motor function of the MG 18.

First, in order to function as a shift prediction means, at step S100 the HV ECU 34 reads the present vehicle speed and the accelerator operation amount, and at steps S101, calculates a shift vehicle speed, that is, calculates a timing of starting an automatic shifting operation. The shift vehicle speed can be predicted based on the vehicle speed and the accelerator operation amount with reference to a shift pattern map or the like. Subsequently, at step S102 the HV ECU 34 determines whether the present vehicle speed corresponds to X sec (e.g., 1 sec) before the shift vehicle speed is reached. This determination can also be made with reference to the aforementioned transition map. If the HV ECU 34 determines that it is presently X sec before the shift vehicle speed is reached, that is it determines that the shift from the low gear side to the high gear side will be performed in X sec, then control proceeds to step S103 wherein the HV ECU 34 functions as a motor control means to output to the MG ECU 30 a command to gradually decrease the motor torque Tm (indicated by a solid line) as indicated by reference character a in FIG. 3. The gradient of the gradual decrease may be calculated, for example, in accordance with the output state of the motor torque Tm so that the motor torque Tm disappears in X sec, or may also be set to a predetermined value. If it is determined in S102 that it is not yet X sec before the shift vehicle speed is reached, the HV ECU 34 returns to step S100, and repeats the aforementioned steps.

At step S104, the HV ECU 34 determines whether the present vehicle speed has reached the shift vehicle speed. If the present vehicle speed has reached the shift vehicle speed, then control proceeds to step S105 wherein the HV ECU 34, via the MG ECU 30, stops the gradual decrease of the motor torque Tm of the MG 18, and starts to gradually increase the motor torque Tm as indicated by reference characters b in FIG. 3. Conversely, if it is determined in S104 that the shift vehicle speed has not been reached, the HV ECU 34 returns to S103, and continues to gradually decrease the motor torque Tm, and executes the determination in S104 again. At step S106, the HV ECU 34 determines whether or not the engine torque Te (indicated by a one-dot chain line) has become completely null (Te=0) and therefore it is possible to change the transmission speed. If Te=0, then control proceeds to step S107 wherein the HV ECU 34 executes a torque assist using the motor torque Tm of the MG 18 that is required during the shifting of the stepwise variable transmission 16. The torque assist using the motor torque Tm is selectively performed in accordance with the shift conditions.

Thus, the motor torque Tm is gradually decreased before the stepwise variable transmission 16 starts a speed shift, that is, before the engine torque Te of the engine 12 starts to be decreased by disengaging the friction clutch 14 in order to start a shifting operation of the stepwise variable transmission 16. Therefore, the total torque Tp transferred to the axles 20 can be gradually decreased before the speed shift starts. As a result, the width of drive torque decrease caused when the engine torque Te is eliminated by disengaging the friction clutch 14 can be reduced. That is, the deceleration shock can be reduced. FIG. 3 indicates, by a broken line, changes in the total torque Tp occurring if the decreasing of the motor torque Tm prior to shifting is not performed. The total torque at the time of disengagement of the friction clutch 14 is indicated by Tp1. With regard to the case where the decreasing of the motor torque Tm prior to shifting is performed, the total torque at the time of disengagement of the friction clutch 14 is indicated by Tp2, and the total torque at the time of disappearance of the engine torque Te is indicated by Tp3. If the decreasing of the motor torque Tm is not performed, the change in torque is Tp1–Tp3. In contrast, if the decreasing of the motor torque Tm is performed, the change in torque is Tp2–Tp3. Thus, the substantial torque displacement is reduced, and the torque change gradient is made gentle, so that the decelerating torque decreases. Due to the decrease of the motor torque Tm, a deceleration of the HV 10 occurs. However, since the total torque Tp is changed gently, substantially no discomfort is caused during the gradual decrease of the motor torque Tm.

When the friction clutch 14 is re-engaged after being disengaged, the engine torque Te is sharply increased as mentioned above, thus causing a shock. In the first embodiment, therefore, the MG 18 is also controlled when the friction clutch 14 is engaged, as well.

The TM ECU 28 is able to recognize an amount of time in advance that is needed to change the transmission speed. Therefore, while executing the assist using the motor torque Tm (S107), the TM ECU 28 determines whether the present time is at most Y sec (e.g., 0.5 sec) prior to the end of the shifting (whether the changing of the transmission speed has ended and an engine torque Te recovery preparation period has come) (S108). If the HV ECU 34 recognizes via the TM ECU 28 that the present time is at most Y sec prior to the end of the shifting, the HV ECU 34 outputs to the MG ECU 30 a command to gradually decrease the torque assist based on the motor torque Tm as indicated by reference character c in FIG. 3 (S109). Simultaneously, the TM ECU 28 starts recovering the engine torque Te. If it is determined in S108 that it is not yet Y sec prior to the end of the shifting, the process returns to S107, and the assist using the motor torque Tm is continued, and the determination in S108 is performed again.

If the TM ECU 28 recognizes the end of the shifting at step S110, that is if it recognizes that the engine torque Te has recovered to a predetermined torque, then control proceeds to step S111 wherein the HV ECU 34 outputs to the MG ECU 30 a command to gradually increase the torque assist using the motor torque Tm as indicated by reference character d in FIG. 3. Subsequently at step S112, the MG ECU 30 executes a required torque assist using the motor torque Tm with the transmission speed set as a result of the shifting operation. As a result, the vehicle can be driven by the total torque Tp requested by a driving person. If it is determined in S110 that the shifting has not ended, the process returns to S109, and the gradual decrease of the motor torque Tm is continued, and the determination in S110 is performed again. At step 113, the control returns to step S100.

Thus, by performing the control of gradually decreasing and gradually increasing the motor torque after the end of the shifting, the total torque Tp can be gently changed. That is, if the gradual decreasing of the motor torque prior to the completion of the shifting were not performed, the recovered amount of the engine torque Te would be added to the motor torque Tp4, so that the total torque Tp would change from Tp4 to, for example, Tp5. In contrast, if the gradual decreasing of the motor torque prior to the completion of the shifting is performed, the total torque Tp changes from Tp4 to, for example, Tp6 via Tp7. Thus, the gradient of changing of the total torque Tp becomes gentle, and the shock at the time of a torque change is reduced.

Thus, through the control of adjusting the timing and amount of torque assist by the MG 18 during a shift control, the deceleration feel (deceleration shock) that occurs during a shifting operation of the HV 10 is reduced, and the discomfort to a driving person is reduced. Although the transitions of the torques indicated in FIG. 3 are linear, the torques may be changed in curved-line fashions in accordance with the feeling of a driving person while achieving substantially the same advantages.

A second embodiment of the invention will be described. By changing the amount of torque assist performed by the MG 18 depending on whether the drive power requested by a driving person is greater than a maximum torque of the MG 18 functioning as a motor (greatest-possible output torque), the deceleration shock caused by a decrease in the engine torque Te can be reduced or eliminated despite performance of the control of eliminating the engine torque Te during a speed shift.

Figure 4:
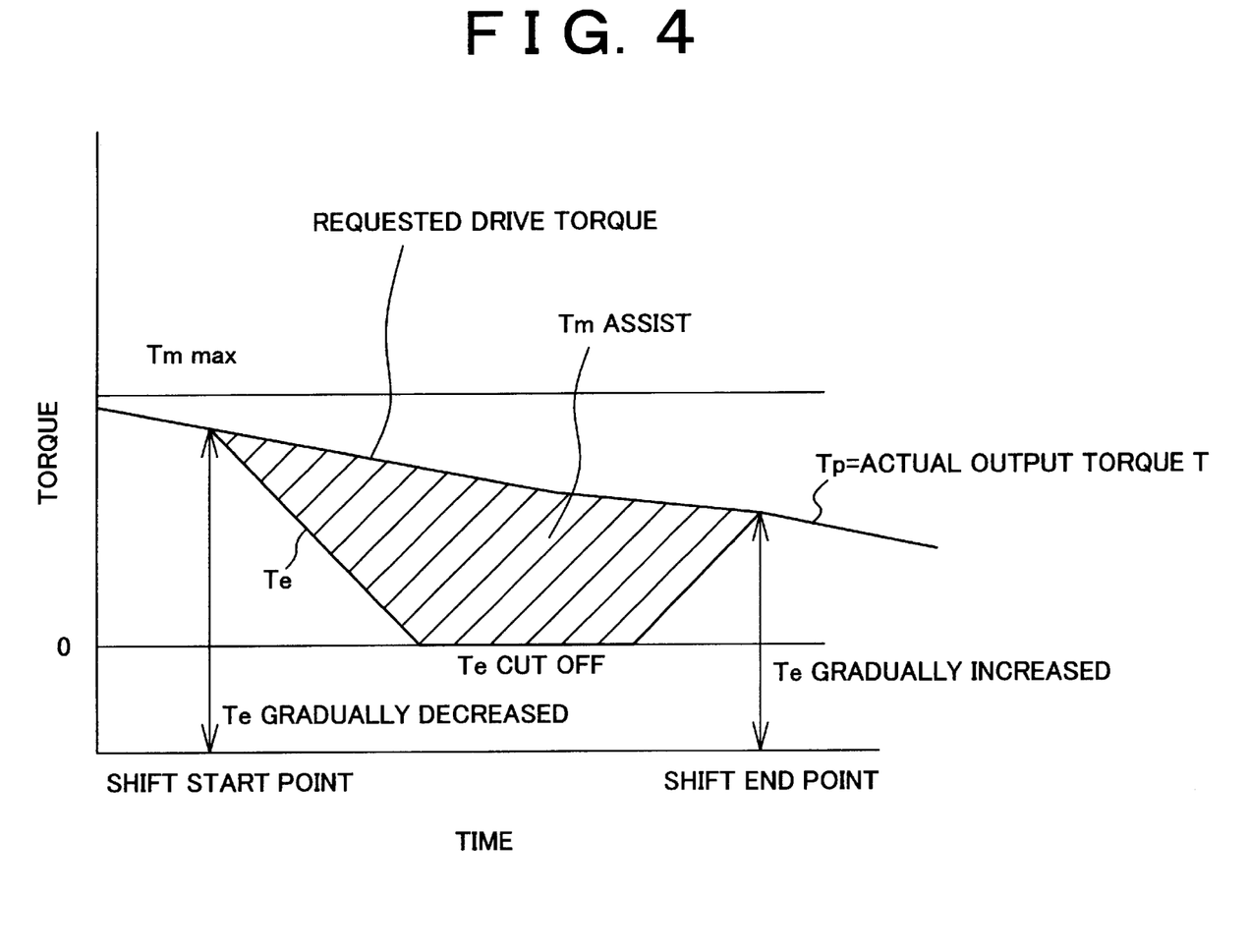
FIG. 4 is a diagram of torque change based on a control in accordance with a second exemplary embodiment of the invention, indicating changes in the engine torque Te, the motor torque Tm and the total torque Tp occurring when the total torque Tp is at most a maximum torque Tmmax of the electric motor.
Figure 5:
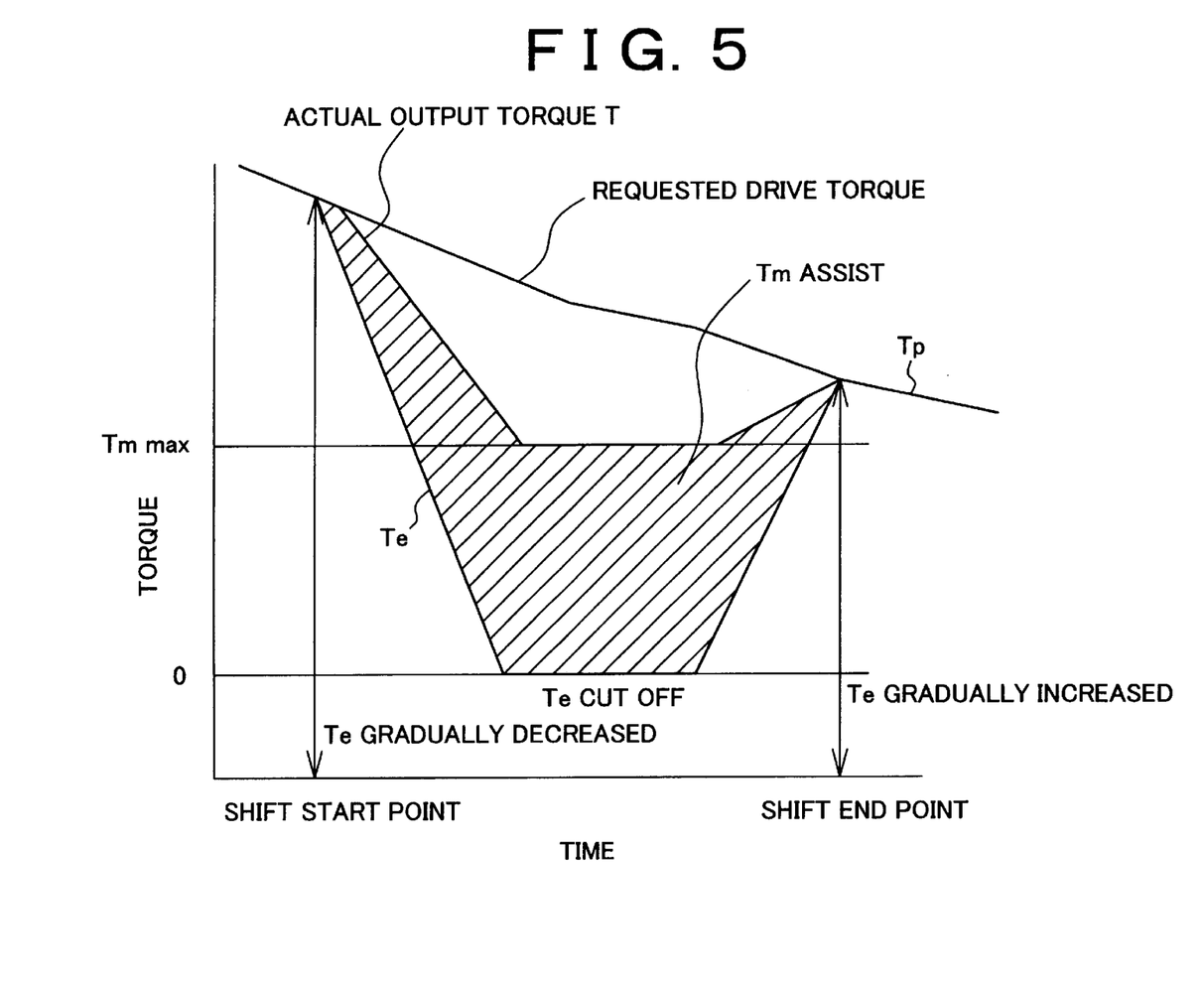
FIG. 5 is a diagram of torque change based on a control in accordance with the second exemplary embodiment of the invention, indicating changes in the engine torque Te, the motor torque Tm and the total torque Tp occurring when the total torque Tp is greater than the maximum torque Tmmax of the electric motor.
Figure 6:
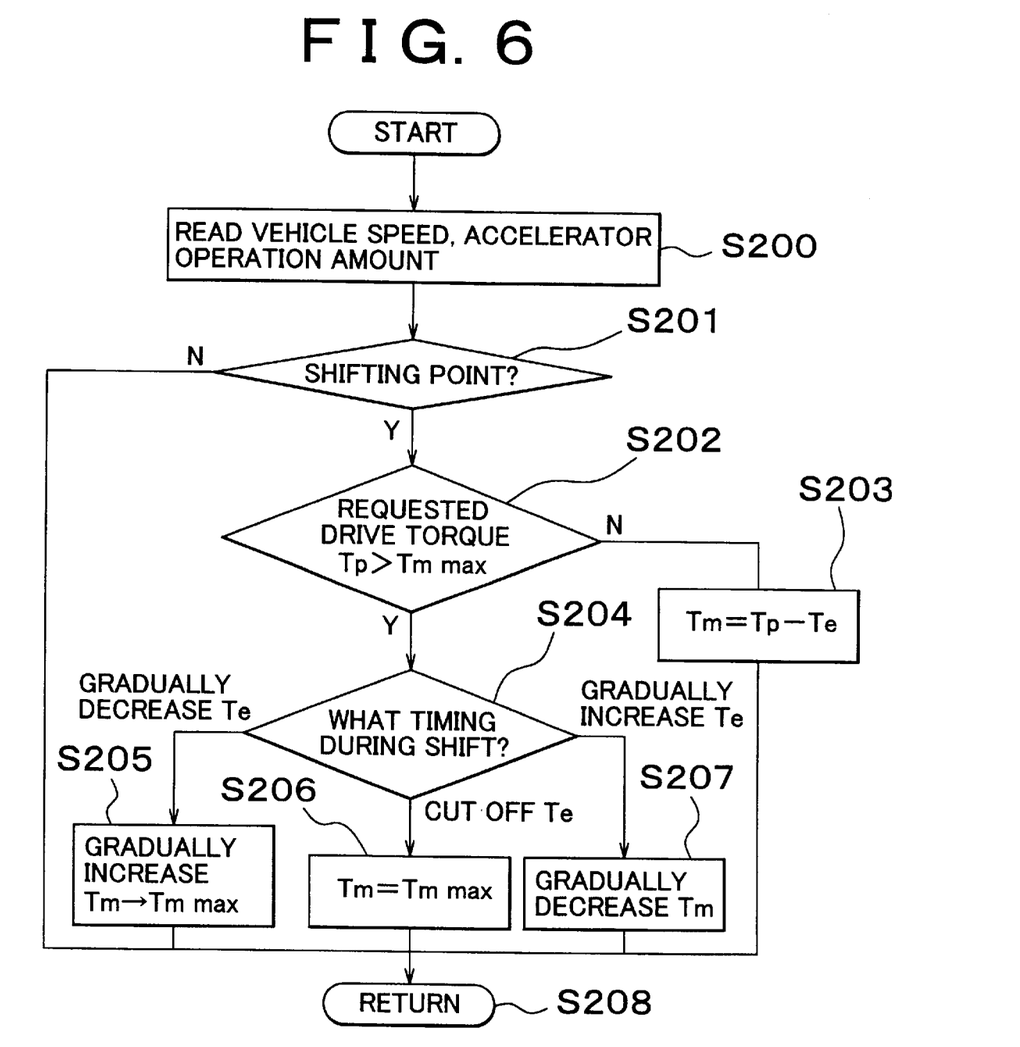
FIG. 6 is a flowchart illustrating a control procedure in accordance with the second exemplary embodiment of the invention.

FIG. 4 indicates transition of the amount of torque assist performed by the MG 18 in a case where the requested amount of drive torque requested by a driving person is smaller than a maximum torque Tmmax of the MG 18 functioning as a motor. FIG. 5 indicates transition of the amount of torque assist performed by the MG 18 if the requested drive torque requested by the driving person is greater than the maximum torque Tmmax of the MG 18 functioning as a motor. FIG. 6 shows a flowchart illustrating a control procedure performed for accomplishing the aforementioned transitions indicated in FIGS. 4 and 5.

Referring to FIG. 6, control begins at step S200 wherein the HV ECU 34 reads in the vehicle speed and the accelerator operation amount. At step S201, the HV ECU 34 determines whether the stepwise variable transmission 16 of the HV 10 is in an automatic shift starting state based on the vehicle speed and the accelerator operation amount. If the stepwise variable transmission 16 is in the automatic shift starting state, then control proceeds to step S202 wherein the HV ECU 34 calculates a requested drive torque Tp requested of the HV 10 at the time of the speed shift, and determines whether the requested drive torque Tp is greater than a maximum torque Tmmax of the electric motor determined with reference to information stored by the battery ECU 32 and the MG ECU 30. If it is determined at step S202 that the requested drive torque Tp is at most the maximum torque Tmmax, then control proceeds to step S203 wherein the HV ECU 34 compensates for the requested drive torque requested of the HV 10 during a period between the elimination of engine torque Te for the shifting and the recovery of engine torque Te by gradually changing the motor torque Tm. That is, a control with Tm=Tp−Te is performed.

That is, if the HV ECU 34 recognizes a start of shifting, the TM ECU 28 starts disengaging the friction clutch 14, and gradually decreases the engine torque Te. Subsequently, the friction clutch 14 is completely disengaged, and the engine torque Te becomes equal to "0", and then the transmission speed is shifted. After the shifting of the transmission speed is completed, the engine torque Te is gradually increased. Then, the running of the vehicle based on a requested drive torque after the shifting is performed. During the transition of the engine torque Te, the amount of assist by the motor torque Tm is changed as indicated by hatching in FIG. 4. That is, the amount of assist by the motor torque Tm is gradually increased when the engine torque Te is gradually decreased. When the engine torque Te is equal to "0", the amount of assist by the motor torque Tm equals the requested drive torque Tp. When the engine torque Te is gradually increased, the amount of assist by the motor torque Tm is gradually decreased. In this case, the entire amount of decrease in the engine torque Te can be compensated for by the motor torque Tm, so that a deceleration shock due to elimination of the engine torque Te does not occur. Furthermore, since the amount of assist by the motor torque Tm is gradually changed in accordance with changes in the engine torque Te, no extreme torque fluctuation or the like occurs, and therefore no discomfort based on torque fluctuation is given to a driving person.

Conversely, if in step S202 the HV ECU 34 determines that the requested drive torque Tp is greater than the maximum torque Tmmax, then control proceeds to step S204 wherein the HV ECU 34 determines at which timing the present shifting state is, that is, whether the present shifting state is a state in which the engine torque Te is being gradually decreased with the friction clutch 14 being disengaged, or a state in which the engine torque Te has been cut off with the friction clutch 14 completely disengaged, or a state in which the engine torque Te is being gradually increased with the friction clutch 14 being engaged.

If the engine torque Te is being gradually decreased, then control proceeds to step S205 wherein the HV ECU 34 controls the MG 18 via the MG ECU 30 so that the torque assist by the motor torque Tm gradually increases toward Tmmax. If the engine torque Te has been cut off, then control proceeds to step S206 wherein the HV ECU 34 controls the MG 18 so that the torque assist by the motor torque Tm becomes equal to the maximum value Tmmax. If the engine torque Te is being gradually increased, then control proceeds to step S207 wherein the HV ECU 34 controls the MG 18 so that the torque assist by the motor torque Tm gradually decreases. At step 208, the control returns to step S200.

Thus, the amount of assist by the motor torque Tm can be gradually changed in accordance with changes in the engine torque Te. Furthermore, when the engine torque Te is eliminated, a maximum output torque T for the requested drive torque Tp can be obtained, by controlling the motor torque Tm so that the motor torque Tm is equal to the maximum value Tmmax. Thus, the discomfort caused by torque fluctuation can be reduced.

When the engine 12 is operated, shifting the stepwise variable transmission 16 to the high side as early as possible improves fuel economy. However, to reduce or exclude a shock during a speed shift, a certain amount of time must be allowed for the requested drive torque Tp to decrease to a certain degree before the shifting operation is started as indicated in FIG. 4. The amount of torque assist that can be provided by the MG 18, that is, the maximum amount thereof Tmmax, changes depending on the state of charge of the HV battery 22. That is, the maximum amount Tmmax increases if the battery 22 is sufficiently charged. Therefore, if the battery 22 is sufficiently charged, the torque assist by the motor torque Tm is possible even with a high requested drive torque Tp. Therefore, if the state of charge of the battery 22 is included as a factor for determining whether the present state is a shift starting state in S201 in the flowchart of FIG. 6, it becomes possible to correct the shift start timing. That is, if the battery 22 is sufficiently charged, the torque assist by the motor torque Tm can be accomplished even with a high requested drive torque Tp. Therefore, the fuel economy can be improved, and the shock at the time of shifting can be reduced.

Conversely, if the battery 22 is not sufficiently charged and therefore the value Tmmax is small so that great torque assist by the motor torque Tm cannot be expected, a certain decrease in the requested drive torque Tp is awaited, that is, determining that the current state is the shift starting state is delayed. Therefore, even if the battery 22 is not sufficiently charged, the shock at the time of shifting can be reduced.

Although in the above-description, the state of charge of the battery 22 is referred to as a shift timing recognition means, it is also possible to achieve substantially the same advantages as mentioned above by determining a shift timing with reference to the temperature of the MG 18. Depending on the temperature of the MG 18, the regenerative efficiency during the charging of the battery 22 and the efficiency of torque generation by the MG 18 change.

As described above, through the control of gradually changing the motor torque Tm, the shock at the time of speed-shifting can be further reduced. However, the friction clutch 14 undergoes a half-clutched state involving slippage during engagement and disengagement thereof. Therefore, if the motor torque Tm is changed based on the engine torque Te recognized by the engine ECU 26 or the like, errors occur in the engine torque Te. Therefore, a control of the motor torque Tm taking slippage of the friction clutch 14 into account will more precisely and effectively reduce the shock.

Figure 7:
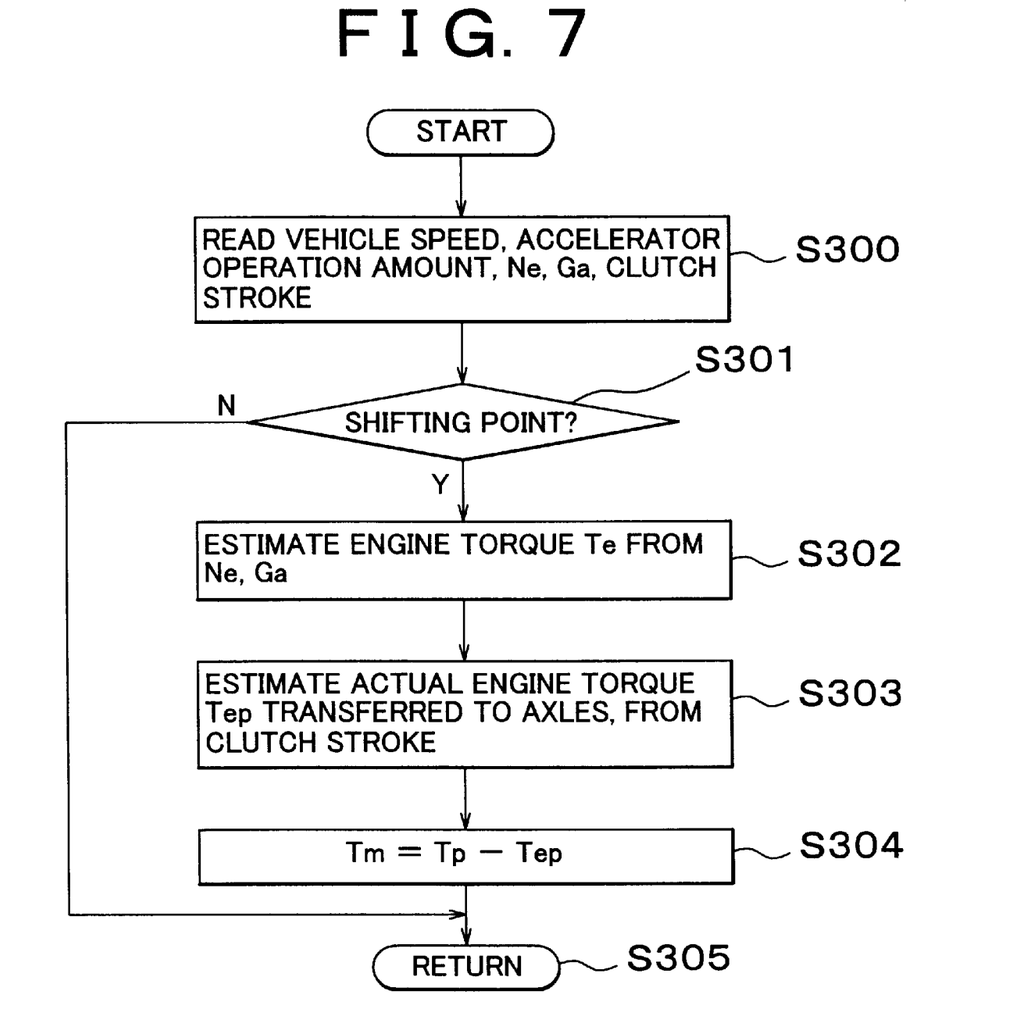
FIG. 7 is a flowchart illustrating a procedure of calculating a motor torque Tm taking slippage of a friction clutch into account in the second exemplary embodiment of the invention.

The flowchart of FIG. 7 illustrates a procedure of calculating a motor torque Tm taking slippage of the friction clutch 14 into consideration. At step S300, the HV ECU 34 reads in the vehicle speed, the accelerator operation amount, the engine revolution speed Ne, the amount of intake air Ga drawn into the engine 12, and the clutch stroke of the friction clutch 14. The control proceeds to step S301, wherein based on the vehicle speed, the accelerator operation amount, and the like, the HV ECU 34 determines whether the stepwise variable transmission 16 of the HV 10 has reached an automatic shift starting state (shift point). If the shift point has been reached, then control proceeds to step S302 wherein the HV ECU 34 estimates an engine torque Te based on the engine revolution speed Ne and the amount of intake air Ga. At step S303, the HV ECU 34 estimates an actual Tep that is transmitted to the axles 20 if slippage of the friction clutch 14 is taken into account, based on a map that employs as parameters the estimated engine torque Te and the clutch stroke of the friction clutch 14. Subsequently, at step S304, the HV ECU 34 subtracts the actual engine torque Tep from the requested drive torque Tp of the HV 10 calculated from the vehicle speed, the accelerator operation amount, or the like, thus more accurately calculating a motor torque Tm during the gradual change control of the engine 12. Therefore, the shock can be effectively reduced. At step 305, the control returns to step S300.

When the stepwise variable transmission 16 is shifted from the high gear side to the low gear side, a driving person operates the accelerator pedal for a sharp acceleration or operates the brake pedal for a sharp deceleration, so that a behavior change of the HV 10, that is, the start of a shifting operation, can be predicted. Therefore, a shock at the time of a shift to the low gear side is not perceived as a discomfort by a driving person. However, a control similar to the control in accordance with the foregoing embodiments will substantially reduce the shock at the time of a shift to the low gear side, and will accomplish a smoother shift control.

According to the invention, since the timing and the amount of torque assist performed by an electric motor during a shifting operation of the stepwise variable transmission are appropriately changed, the deceleration shock at the time of shifting can be reduced and the discomfort perceived by a driving person can be reduced.

In the illustrated embodiments, the main controller, the ECUs 26, 28, 30, 32 and 34, are implemented as a programmed general purpose computer. It will be appreciated by those skilled in the art that the ECUs 26, 28, 30, 32 and 34 can be controllers that are implemented using single special purpose integrated circuits (e.g., ASIC) having a main or central processor section for overall, system-level control, and separate sections dedicated to performing various different specific computations, functions and other processes under control of the central processor section. The respective controllers can each be a plurality of separate dedicated or programmable integrated or other electronic circuits or devices (e.g., hardwired electronic or logic circuits such as discrete element circuits, or programmable logic devices such as PLDs, PLAs, PALs or the like). The respective controllers can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controllers. A distributed processing architecture can be used for maximum data/signal processing capability and speed.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A control apparatus for a hybrid vehicle including: an internal combustion engine; a stepwise variable transmission capable of automatic shifting; a clutch that is disposed between the internal combustion engine and the stepwise variable transmission and that discontinues and establishes a power transfer between the internal combustion engine and the stepwise variable transmission; and an electric motor that is disposed between the stepwise variable transmission and a drive wheel and that drives the drive wheel and performs regenerative power generation using the drive wheel, the control apparatus comprising:

a shift controller that predicts a shifting operation of the stepwise variable transmission, performs the shifting operation of the stepwise variable transmission at a start of elimination of a drive torque of the internal combustion engine caused by a disengagement of the clutch, and recovers the drive torque of the internal combustion engine by re-engaging the clutch, when the hybrid vehicle is running coordinately by the drive torque generated by the internal combustion engine and a drive torque generated by the electric motor; and a motor controller that increases and decreases the drive torque of the electric motor based on a predicted automatic shifting operation of the stepwise variable transmission.

2. A control apparatus for a hybrid vehicle according to claim 1, wherein the motor controller gradually decreases the drive torque of the electric motor prior to a start of the automatic shifting operation based on the predicted start of the automatic shifting operation of the stepwise variable transmission, and gradually increases the drive torque of the electric motor between a start of elimination of the drive torque of the internal combustion engine and an end of the elimination.

3. A control apparatus for a hybrid vehicle according to claim 2, wherein the motor controller gradually decreases the drive torque of the electric motor prior to an end of the automatic shifting operation based on the predicted end of the automatic shifting operation of the stepwise variable transmission, and gradually increases the drive torque of the electric motor following an end of recovery of the drive torque of the internal combustion engine.

4. A control apparatus for a hybrid vehicle according to claim 3, wherein the shift controller predicts an operation timing of the automatic shifting operation of the automatic stepwise variable transmission based on at least an accelerator operation amount and a vehicle speed of the hybrid vehicle.

5. A control apparatus for a hybrid vehicle according to claim 2, wherein the shift controller predicts an operation timing of the automatic shifting operation of the automatic stepwise variable transmission based on at least an accelerator operation amount and a vehicle speed of the hybrid vehicle.

6. A control apparatus for a hybrid vehicle according to claim 1, wherein the motor controller gradually decreases the drive torque of the electric motor prior to an end of the automatic shifting operation based on the predicted end of the automatic shifting operation of the stepwise variable transmission, and gradually increases the drive torque of the electric motor following an end of recovery of the drive torque of the internal combustion engine.

7. A control apparatus for a hybrid vehicle according to claim 6, wherein the shift controller predicts an operation timing of the automatic shifting operation of the automatic stepwise variable transmission based on at least an accelerator operation amount and a vehicle speed of the hybrid vehicle.

8. A control apparatus for a hybrid vehicle according to claim 1, wherein the shift controller predicts an operation timing of the automatic shifting operation of the automatic stepwise variable transmission based on at least an accelerator operation amount and a vehicle speed of the hybrid vehicle.

9. A control apparatus for a hybrid vehicle including: an internal combustion engine; a stepwise variable transmission capable of automatic shifting; a clutch that is disposed between the internal combustion engine and the stepwise variable transmission and that discontinues and establishes a power transfer between the internal combustion engine and the stepwise variable transmission; and an electric motor that is disposed between the stepwise variable transmission and a drive wheel and that drives the drive wheel and performs regenerative power generation using the drive wheel, the control apparatus comprising:

a controller that recognizes an outputtable maximum torque that the electric motor is able to output;

a shift controller that performs a shifting operation of the stepwise variable transmission at a start of elimination of a drive power of the internal combustion engine caused by disengaging the clutch, recovers the drive torque of the internal combustion engine by re-engaging the clutch, and recognizes an automatic shifting operation, when the hybrid vehicle is running based on at least the drive torque generated by the internal combustion engine; and a motor controller that changes an amount of torque assist from the electric motor in accordance with a requested drive torque and the outputtable maximum torque during an automatic shifting operation of the stepwise variable transmission.

10. A control apparatus for a hybrid vehicle according to claim 9, wherein the motor controller gradually increases the amount of torque assist from the electric motor during an operation of eliminating the drive torque of the internal combustion engine, and wherein the motor controller gradually decreases the amount of torque assist from the electric motor during an operation of recovering the drive torque of the internal combustion engine.

11. A control apparatus for a hybrid vehicle according to claim 10, wherein if the requested drive torque is at most the outputtable maximum torque of the electric motor during the shifting operation of the stepwise variable transmission, the motor controller gradually changes and controls the drive torque of the electric motor so that the drive torque of the electric motor reaches the requested drive torque.

12. A control apparatus for a hybrid vehicle according to claim 11, wherein a timing of starting the automatic shifting operation of the stepwise variable transmission is corrected based on an amount of charge in a battery for driving the electric motor.

13. A control apparatus for a hybrid vehicle according to claim 11, wherein the motor controller corrects the drive torque of the electric motor in accordance with an operation stroke of the clutch.

14. A control apparatus for a hybrid vehicle according to claim 10, wherein if the requested drive torque is greater than the outputtable maximum torque of the electric motor during the shift operation of the stepwise variable transmission, the motor controller gradually changes and controls the drive torque of the electric motor so that the drive torque of the electric motor reaches the outputtable maximum torque during a state in which the drive torque of the internal combustion engine is eliminated.

15. A control apparatus for a hybrid vehicle according to claim 14, wherein a timing of starting the automatic shifting operation of the stepwise variable transmission is corrected based on an amount of charge in a battery for driving the electric motor.

16. A control apparatus for a hybrid vehicle according to claim 14, wherein the motor controller corrects the drive torque of the electric motor in accordance with an operation stroke of the clutch.

17. A control apparatus for a hybrid vehicle according to claim 9, wherein if the requested drive torque is at most the outputtable maximum torque of the electric motor during the shifting operation of the stepwise variable transmission, the motor controller gradually changes and controls the drive torque of the electric motor so that the drive torque of the electric motor reaches the requested drive torque.

18. A control apparatus for a hybrid vehicle according to claim 17, wherein a timing of starting the automatic shifting operation of the stepwise variable transmission is corrected based on an amount of charge in a battery for driving the electric motor.

19. A control apparatus for a hybrid vehicle according to claim 17, wherein the motor controller corrects the drive torque of the electric motor in accordance with an operation stroke of the clutch.

20. A control apparatus for a hybrid vehicle according to claim 9, wherein if the requested drive torque is greater than the outputtable maximum torque of the electric motor during the shift operation of the stepwise variable transmission, the motor controller gradually changes and controls the drive torque of the electric motor so that the drive torque of the electric motor reaches the outputtable maximum torque during a state in which the drive torque of the internal combustion engine is eliminated.

21. A control apparatus for a hybrid vehicle according to claim 20, wherein a timing of starting the automatic shifting operation of the stepwise variable transmission is corrected based on an amount of charge in a battery for driving the electric motor.

22. A control apparatus for a hybrid vehicle according to claim 20, wherein the motor controller corrects the drive torque of the electric motor in accordance with an operation stroke of the clutch.

23. A control apparatus for a hybrid vehicle according to claim 9, wherein a timing of starting the automatic shifting operation of the stepwise variable transmission is corrected based on an amount of charge in a battery for driving the electric motor.

24. A control apparatus for a hybrid vehicle according to claim 23, wherein the motor controller corrects the drive torque of the electric motor in accordance with an operation stroke of the clutch.

25. A control apparatus for a hybrid vehicle according to claim 9, wherein the motor controller corrects the drive torque of the electric motor in accordance with an operation stroke of the clutch.

26. A control method for a hybrid vehicle including: an internal combustion engine; a stepwise variable transmission capable of automatic shifting; a clutch that is disposed between the internal combustion engine and the stepwise variable transmission and that discontinues and establishes a power transfer between the internal combustion engine and the stepwise variable transmission; and an electric motor that is disposed between the stepwise variable transmission and a drive wheel and that drives the drive wheel and performs regenerative power generation using the drive wheel, the control method comprising:
- predicting an automatic shifting operation timing based on at least one of an accelerator operation amount and a vehicle speed of the hybrid vehicle;
- gradually decreasing the drive torque of the electric motor prior to a start of an automatic shifting operation of the stepwise variable transmission, and gradually increasing the drive torque of the electric motor between elimination of the drive torque of the internal combustion engine and an end of the elimination; and
- gradually decreasing the drive torque of the electric motor prior to an end of the automatic shifting operation of the stepwise variable transmission, and gradually increasing the drive torque of the electric motor following an end of a recovery of the drive torque of the internal combustion engine.

27. A control method for a hybrid vehicle according to claim 26, further comprising recognizing a maximum torque that the electric motor is able to output, wherein the drive torque of the electric motor is changed in accordance with the maximum torque and a requested drive torque that is requested of the hybrid vehicle.

28. A control method for a hybrid vehicle including: an internal combustion engine; a stepwise variable transmission capable of automatic shifting; a clutch that is disposed between the internal combustion engine and the stepwise variable transmission and that discontinues and establishes a power transfer between the internal combustion engine and the stepwise variable transmission; and an electric motor that is disposed between the stepwise variable transmission and a drive wheel and that drives the drive wheel and performs regenerative power generation using the drive wheel, the control method comprising:
- predicting an automatic shifting operation timing based on at least one of an accelerator operation amount and a vehicle speed of the hybrid vehicle; and
- gradually decreasing the drive torque of the electric motor prior to a start of an automatic shifting operation of the stepwise variable transmission, and gradually increasing the drive torque of the electric motor between elimination of the drive torque of the internal combustion engine and an end of the elimination.

29. A control method for a hybrid vehicle including: an internal combustion engine; a stepwise variable transmission capable of automatic shifting; a clutch that is disposed between the internal combustion engine and the stepwise variable transmission and that discontinues and establishes a power transfer between the internal combustion engine and the stepwise variable transmission; and an electric motor that is disposed between the stepwise variable transmission and a drive wheel and that drives the drive wheel and performs regenerative power generation using the drive wheel, the control method comprising:
- predicting an automatic shifting operation timing based on at least one of an accelerator operation amount and a vehicle speed of the hybrid vehicle; and
- gradually decreasing the drive torque of the electric motor prior to an end of the automatic shifting operation of the stepwise variable transmission, and gradually increasing the drive torque of the electric motor following an end of a recovery of the drive torque of the internal combustion engine.

* * * * *